(12) United States Patent
Moscato et al.

(10) Patent No.: US 12,129,048 B2
(45) Date of Patent: Oct. 29, 2024

(54) CRASH BARRIER FOR AIRCRAFT

(71) Applicant: CURTISS-WRIGHT ARRESTING SYSTEMS SAS, Merpins (FR)

(72) Inventors: Jean-Pierre Moscato, Moissy-Cramayel (FR); Paul Ryan, Moissy-Cramayel (FR); Armand Brielle, Moissy-Cramayel (FR); Xavier Christian Marcel Millet, Moissy-Cramayel (FR)

(73) Assignee: CURTISS-WRIGHT ARRESTING SYSTEMS SAS, Merpins (FR)

( * ) Notice: Subject to any disclaimer, the term of this patent is extended or adjusted under 35 U.S.C. 154(b) by 0 days.

(21) Appl. No.: 18/259,482

(22) PCT Filed: Dec. 27, 2021

(86) PCT No.: PCT/FR2021/052458
§ 371 (c)(1),
(2) Date: Jun. 27, 2023

(87) PCT Pub. No.: WO2022/144524
PCT Pub. Date: Jul. 7, 2022

(65) Prior Publication Data
US 2024/0327031 A1    Oct. 3, 2024

(30) Foreign Application Priority Data

Dec. 29, 2020  (FR) ........................ 2014048

(51) Int. Cl.
*B64F 1/02*    (2006.01)
(52) U.S. Cl.
CPC .................... *B64F 1/027* (2020.01)
(58) Field of Classification Search
CPC .......... B64F 1/027; B64F 1/029; B64U 70/30; B64D 17/36; F16F 7/006; F16F 7/003
(Continued)

(56) References Cited

U.S. PATENT DOCUMENTS 3,069,118 A * 12/1962 Bernard .................. B64F 1/027
244/110 R
4,143,840 A * 3/1979 Bernard .................. B64F 1/027
244/110 C

FOREIGN PATENT DOCUMENTS

DE     1 198 682 B    8/1965
FR     2 316 483 A1   1/1977
(Continued)

OTHER PUBLICATIONS

International Search Report for corresponding International Application No. PCT/FR2021/052458 mailed Apr. 12, 2022.
(Continued)

*Primary Examiner* — Richard Green
(74) *Attorney, Agent, or Firm* — Pearne & Gordon LLP

(57) ABSTRACT

A crash barrier for an aircraft, which includes an array of elementary nets arranged parallel to each other. Each elementary net includes a generally vertical stop structure which extends between a first upper strap and at least one second lower strap. The first and second straps each includes two end portions for attaching to a braking device, wherein the end portions of the one and/or the other of the upper and lower straps includes a loosened intermediate section, that is, which is not tensed and which forms an "overlength." The barrier includes an additional strap of which the opposite ends are fastened by linking means to the corresponding ends of the loosened intermediate section. The additional strap includes a region in which it is constituted by two distinct and contiguous strands. The binding wire, that is, the weft or warp wire of this additional strap being common to the two strands. The pull-out resistance of the binding wire being less than that of the linking means.

6 Claims, 7 Drawing Sheets

(58) Field of Classification Search
USPC .................................................... 244/110 C
See application file for complete search history.

(56) References Cited

FOREIGN PATENT DOCUMENTS

| | | |
|---|---|---|
| FR | 2 360 467 A1 | 3/1978 |
| FR | 2 361 271 A1 | 3/1978 |
| FR | 2361271 A * 4/1978 | ................ B64F 1/02 |
| WO | 89/10302 A1 | 11/1989 |

OTHER PUBLICATIONS

Written Opinion for corresponding International Application No. PCT/FR2021/052458 dated Apr. 12, 2022.
French Search Report for corresponding French Application No. FR2014048 dated Sep. 1, 2021.

\* cited by examiner

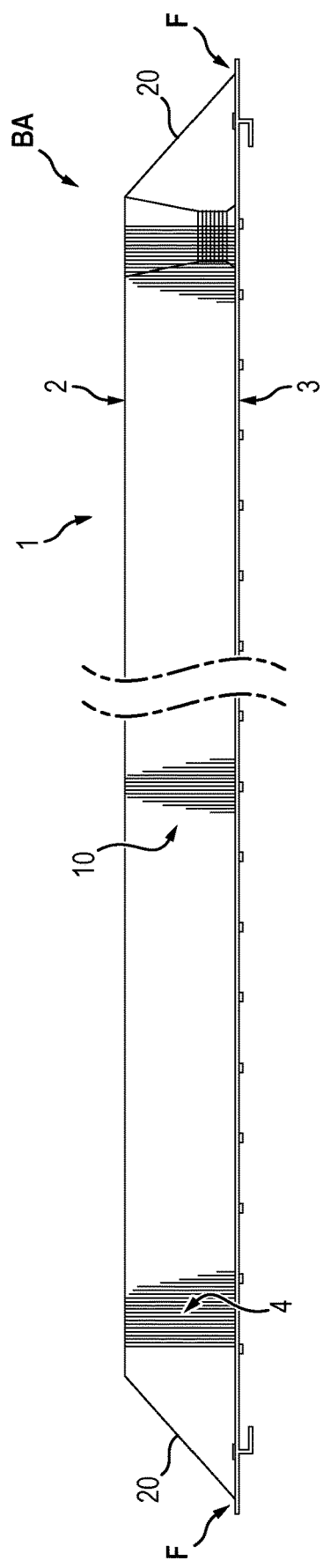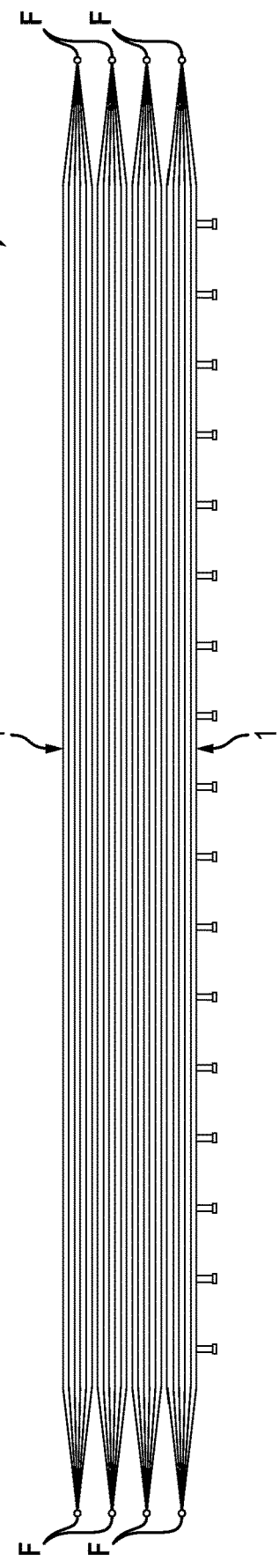

CRASH BARRIER FOR AIRCRAFT

CROSS-REFERENCE TO RELATED APPLICATIONS

This application is a national stage entry of International Application No. PCT/FR2021/052458 filed on Dec. 27, 2021, which claims the benefit of priority to French Application No. FR2014048, filed Dec. 29, 2020, the entire disclosures of which are hereby incorporated herein by reference.

GENERAL TECHNICAL FIELD

The present invention relates to a crash barrier for an aircraft.

PRIOR ART

The prior art discloses using crash barriers at the end of a runway for retaining and stopping military planes of which a system is defective on landing or take-off.

However, some aircraft are fitted with relatively fragile external equipment such that it is important for such a barrier not to exert excessive forces on these fragile zones at the risk of damaging them, but while still stopping the aircraft.

Such a barrier is generally constituted as illustrated in the appended FIGS. 1 to 3.

This barrier BA is constituted here by an array of twenty-four individual nets distributed in four groups of six elementary nets 1, arranged parallel to each other. This is of course a purely illustrative example, and the number of individual nets and groups can be different to that illustrated here.

Each elementary net 1 is constituted overall by an upper strap 2 and one or more lower straps 3 between which an array of bands 4 is arranged, strictly speaking to form a generally vertical stop structure 10 engaging with the aircraft to stop it.

This stop structure 10 is registered overall in a rectangle the long sides of which extend horizontally. Of course, the upper 2 and lower 3 straps have a greater length than that of the stop structure 10 of the net 1 per se, such that on either side of the stop structure there are end portions 20 and 30 for attaching the straps 2 and 3 to a braking device F (not shown in the figures) which is fitted to absorb the kinetic energy of the aircraft.

The same braking device F equips a plurality of groups, each group in turn being composed of a plurality of elementary nets 1. In this case, in the figures appended as an example the same braking device F is common to four groups of six nets 1.

It is evident in FIGS. 1 to 3 that exemption was made from showing complementary equipment of the barrier BA, such as a hoisting and bracing system for keeping the nets 1 in vertical position, as well as a system which combines the groups of nets at the end towards the braking device F.

Therefore, when a plane engages with the barrier BA, to a certain extent it is accompanied in its movement by the nets 1, then immobilised by the latter and being held up by the braking device F.

In the past, the aim was to reduce stresses in the net straps to slow down their breaking in the event where the straps were blocked in a position without being able to change from this, and this gave better distribution of stresses over the surfaces of the aircraft.

Document FR2361271 describes a solution of this type and is partly illustrated in FIG. 4.

This figure partially illustrates part of the upper strap 2 which equips each net 1. This part is the portion 20, which is located between the stop structure 10 and the braking device F.

The current example concerns the part of the strap 2 which is on the left part of the net 1, with respect to FIG. 1. But, what is described hereinbelow also applies for the part located to the left. The same applies for the portions 30 of the lower strap(s) 3.

FIG. 4 shows that the strap portion 20 is not fully tensed between the stop structure 10 of the net 1 and the braking device S, but instead comprises an intermediate section 21 which can be qualified as "loosened section". To some extent this loosened section 21 "pays out slack" to the strap 2.

This section 21 is represented here in the form of a "U", for the sake of simplification and clarity of the subject.

The strap portion 20 illustrated here is therefore constituted by the net 1 in the direction of the braking device F, of a tensed segment 201, which continues by way of the above section 21, in turn constituted by two segments 22 and 23 combined in parallel by a curved segment 24. The section 21 continues by way of another tensed segment 202, in the direction of the braking device F.

As FIG. 4 clearly shows, the section 21 is provided with three short additional straps, which can be qualified as fusible elements.

These three additional straps are referenced 5A, 5B and 5C. The first strap 5A is fastened to the above segments 201 and 202, while the straps 5B and 5C, U-shaped, are fastened to the segments 22 and 23.

The fastening is achieved by any means known to the skilled person, such as sewing. The material which constitutes the additional straps 5A, 5B and 5C can be the same as that of the main strap 2, or can be different.

When the elementary net 1 is subjected to considerable forces this first causes tensing of the strap 2, which immediately causes the additional straps 5A to 5C to break. The loosened section 21 of the strap 2 is therefore no longer immobilised and can be tensed accordingly.

Such a device suffers from a major inconvenience. In fact, it is noted that the straps 5A to 5C very often exhibit "all or nothing" behaviour. This means that these straps all break almost at the same time, because they exhibit identical characteristics. Consequently, a substantial overlength is imparted all of a sudden to the strap 2, causing uncontrolled slackening of the elementary net 1 and critical damage over the surfaces of the aircraft during simultaneous overloads to the other nets.

Additional prior art is constituted by documents FR2360467, DE1198682, FR2316483 and WO89/10302.

The aim of the present invention is to resolve the problem explained above by proposing a crash barrier of the type mentioned, for which an overlength of one and/or the other of the upper 2 and lower 3 straps is liberated progressively.

PRESENTATION OF THE INVENTION

For this purpose, the present invention proposes a crash barrier for an aircraft, which comprises an array of elementary nets arranged parallel to each other, each elementary net comprising a generally vertical stop structure which extends between a first upper strap and at least one second lower strap, these first and second straps each comprising two end portions for attaching to a braking device, said end portions of the one and/or the other of said upper and lower strap comprising a loosened intermediate section, that is, which is not tensed and which forms an "overlength", said barrier comprising an additional strap of which the opposite ends are fastened by linking means to the corresponding ends of said loosened intermediate section, characterised in that said additional strap comprises a region in which it is constituted by two distinct and contiguous strands, the binding wire, that is, the weft or warp wire of this additional strap being common to said two strands, the pull-out resistance of said binding wire being less than that of said linking means.

Due to these characteristics, a progressive overlength is conferred on the one and/or the other upper and lower straps, effectively "meting out" the movement of each elementary net of the barrier.

In other terms, each elementary net moves as a function of the stresses it undergoes, and does this smoothly such that the risk of damage to the surface of the aircraft is minor.

According to other advantageous and non-limiting characteristics of the invention, taken singly or according to any technically compatible combination:
said linking means comprise sewing wires, or are formed by adhesion or assembly by high-frequency welding;
said sewing wires extend over a length of at least 50 millimetres;
the total length of said loosened intermediate section is more than the total length of said additional strap when said strands are separated.

DESCRIPTION OF THE FIGURES

Other characteristics and advantages of the invention will emerge from the following description in reference to the appended drawings which by way of indicative but non-limiting manner represent different possible embodiments, in which:

FIG. 1 is a diagram showing a frontal view of a crash barrier for aircraft;

FIG. 2 is a block diagram of the barrier of FIG. 1, in plan view;

DETAILED DESCRIPTION OF THE INVENTION

Figure 3:
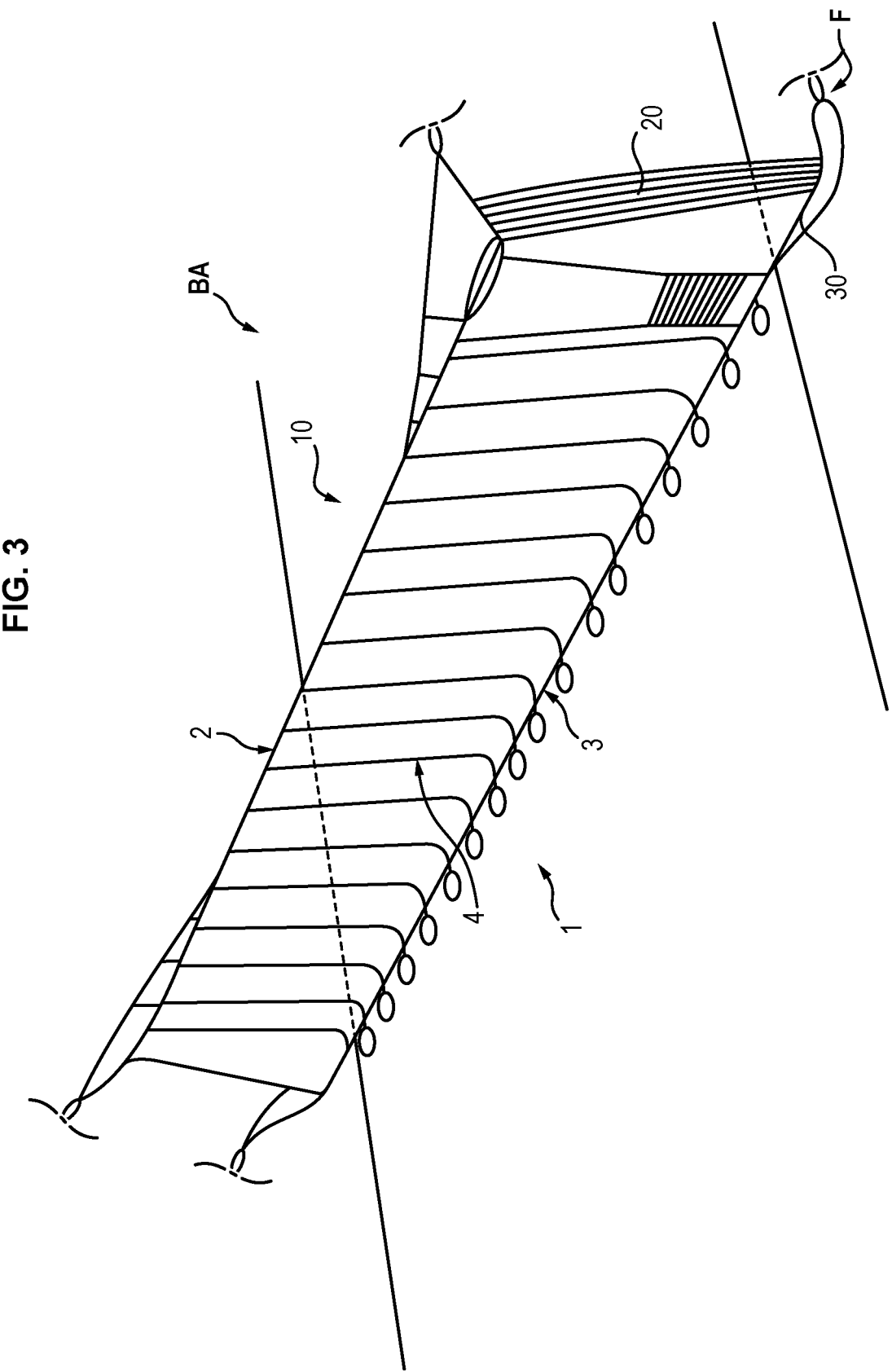
FIG. 3 is a block diagram, in perspective, of a barrier such as that of FIGS. 1 and 2.

The present invention applies to a barrier BA such as the one described above. Consequently, what has been described earlier in relation to FIGS. 1 to 3 also applies to the following.

Figure 5:
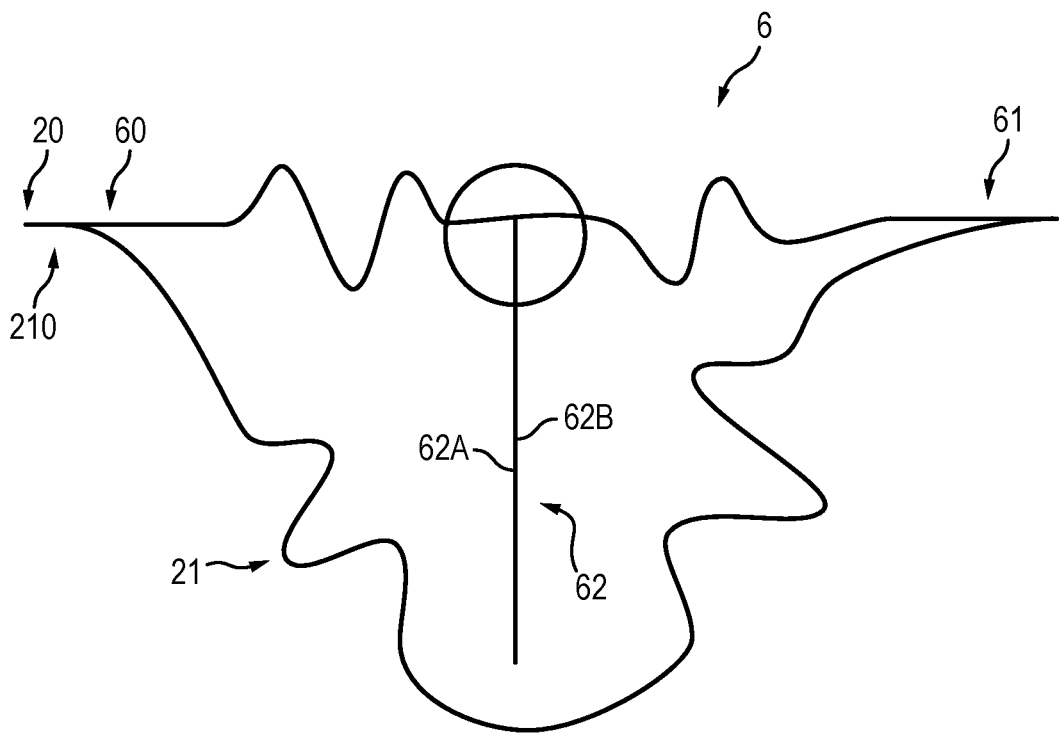
FIG. 5 is a diagram similar to FIG. 4, but showing part of the solution according to the invention.
Figure 6:
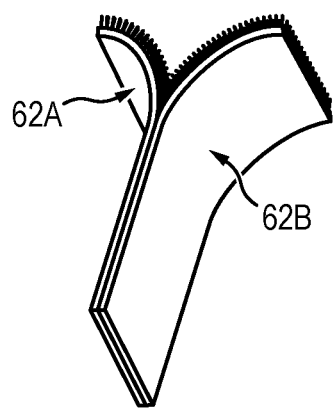
FIG. 6 is an enlarged view of the zone of FIG. 5 marked by a circle.
Figure 7:
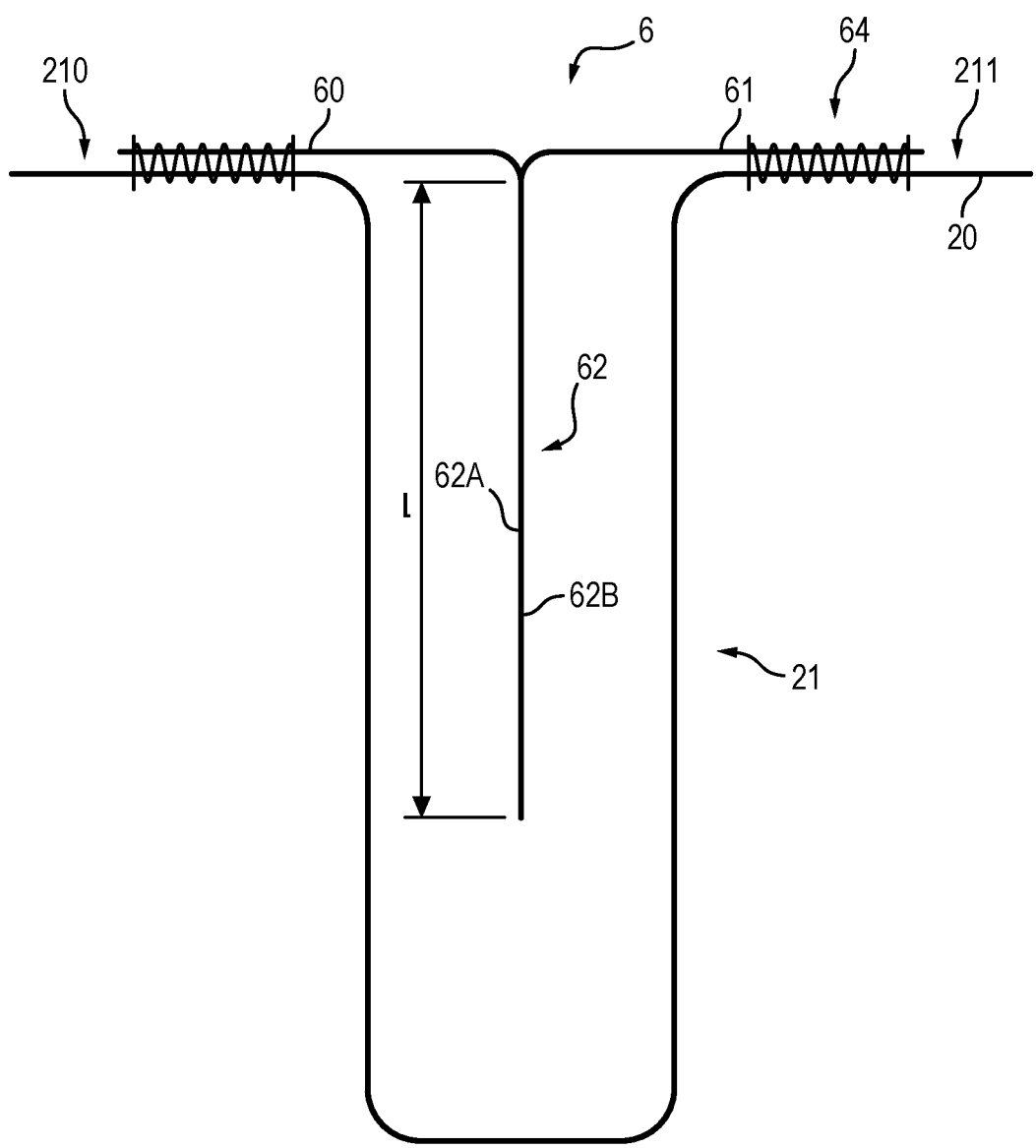
FIG. 7 is a simplified diagram, similar to that of FIG. 5.

The specificity of the barrier according to the invention forms the subject of the attached FIGS. 5 to 7.

As in FIG. 4 above, the focus here is one of the end portions 20 of the upper strap 2, given that what is specified hereinbelow applies also for the second end portion of this strap 2, or even for the end portions 30 of the lower strap(s) 3.

The illustrated portion 20 therefore comprises a loosened intermediate section 21, that is, one which is not tensed when the barrier is not being used.

In keeping with the invention, this deals with an additional strap 6 of which the opposite ends 60 and 61 are fastened by linking means 64 (see FIG. 7) to the corresponding ends 210 and 211 of said loosened intermediate section 21.

Advantageously, these linking means 64, which can consist for example of sewing wires, preferably extend over 50 to 200 millimetres. Other linking techniques 20 such as adhesion, assembly by high-frequency welding, etc. can be used here, of course.

Still according to a characteristic of the invention, this additional strap 6 can comprise a region 62, situated preferably mid-distance from its ends 60 and 61, which is constituted by two strands 62A and 62B, to a certain extent forming distinct and contiguous elementary straps, joined together. In other words, the strap 6 is formed by two elementary straps 62A and 62B which are connected to each other in the region 62 where they are contiguous.

The particular feature of these two strands (or elementary straps) 62A and 62B is that the binding wire, that is, the warp wire or the weft wire which connects it in the region 62 is common. They are to a certain extent interlocked with each other. This interlocking is preferably done during weaving of the strap 6. This type of additional strap can be qualified as "tear strap".

In keeping with the invention, the pull-out resistance of the above binding wire is less than that of said linking means 64, in this case sewing wires.

In this way, once an elementary net 1 is subjected to force it is first of all the unattached parts of the strap 6 which will be tensed. Then, if this force increases, it is part of the binding wire of the upper part of the strands 62A and 62B which will give way as priority.

This is illustrated symbolically in FIG. 6 showing that the upper parts of the strands 62A and 62B move away from each other.

If the force remains stable, the "separation" of strands 62A and 62B stops at this point.

But once the force increases, separation of the strands progresses and so on.

Therefore, each elementary net 1 moves as a function of the stresses it undergoes, and this progressively and smoothly.

Of course, provided the binding wire above gives way fully, the strands 62A and 62B are no longer contiguous, such that the entire intermediate section 21 is now not loosened but instead tensed. The braking device F can transmit the entire braking force to the elementary nets 1.

To the extent where the stresses are not the same for all the elementary nets 1, each moves independently of the other, contributing individually and jointly to immobilisation of the aircraft, without affecting all its fragile parts.

By way of indication and as illustrated in FIG. 7, the length l of each strand 62A and 62B is between 300 and 2000 millimetres, while the total length of the intermediate section 21 is between 1000 and 5000 millimetres.

According to a characteristic of the invention, the total length of said loosened intermediate section 21 is more than the length of the strap 6 once the tear is complete, given the intrinsic elasticity of the material which constitutes the unitary straps of the strap 6.

Figure 4:
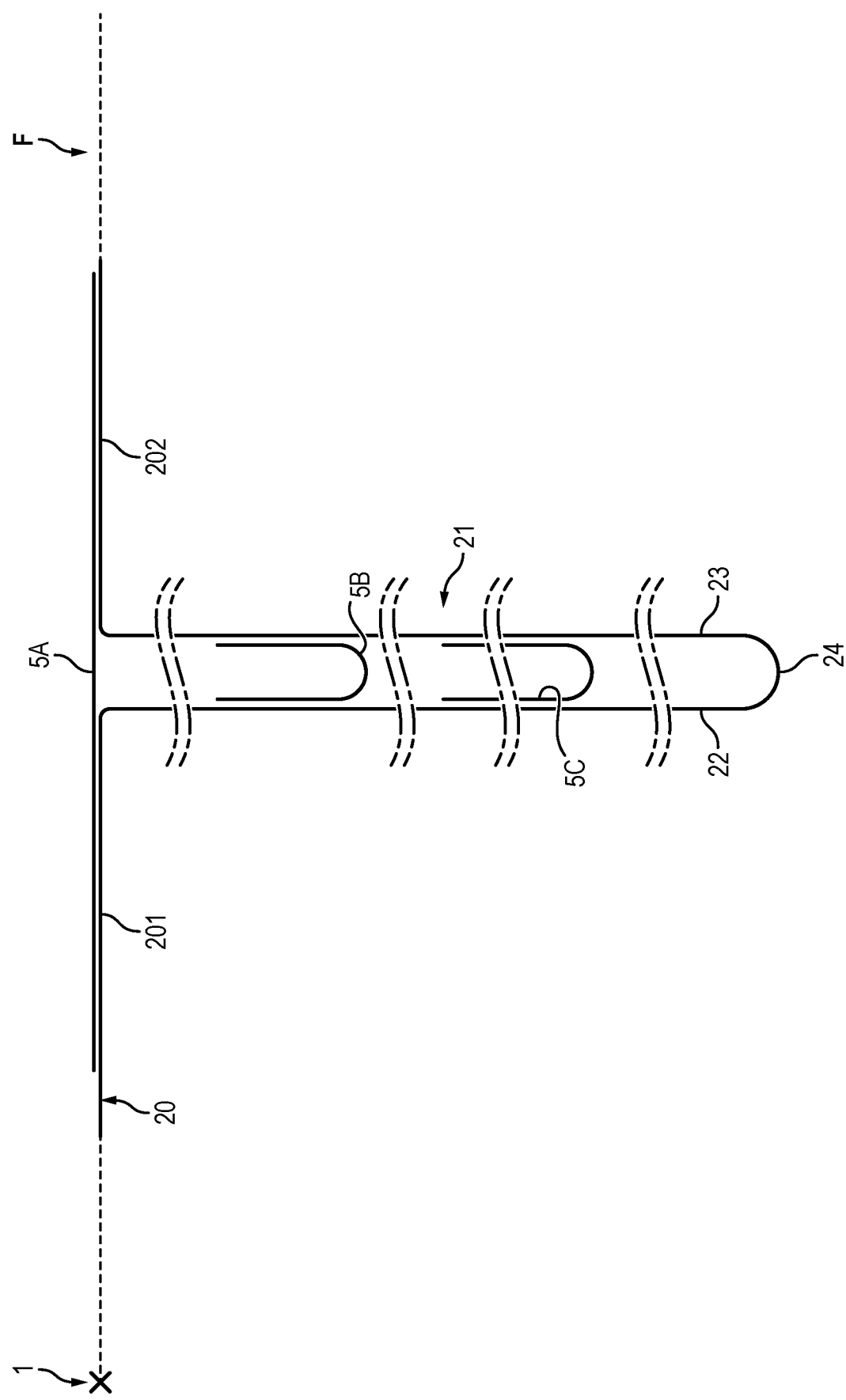
FIG. 4 is a diagram which aims to illustrate the structure and the operation of a solution according to the prior art which equips some crash barriers and which distributes the stresses applied by the latter to the aircraft to be stopped.
Figure 8:
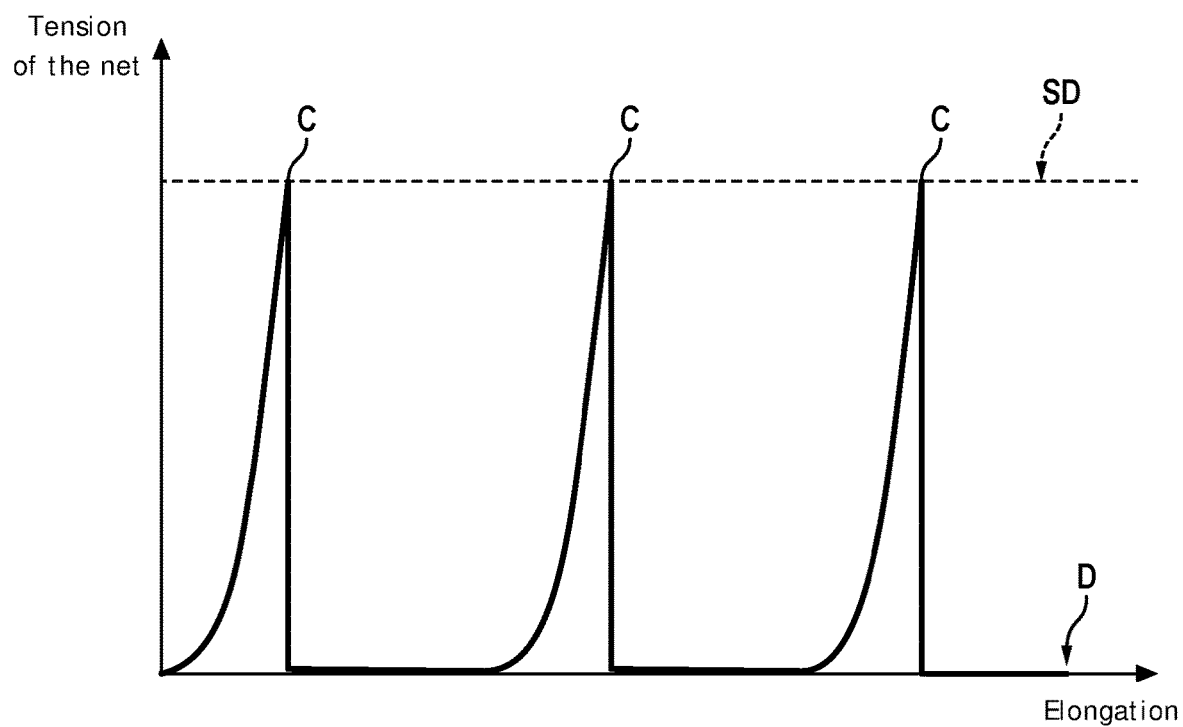
FIG. 8 is a graphic showing, as a function of the tension exerted on a net of a barrier, the elongation of a strap it is fitted with, and this according to the prior art.
Figure 9:
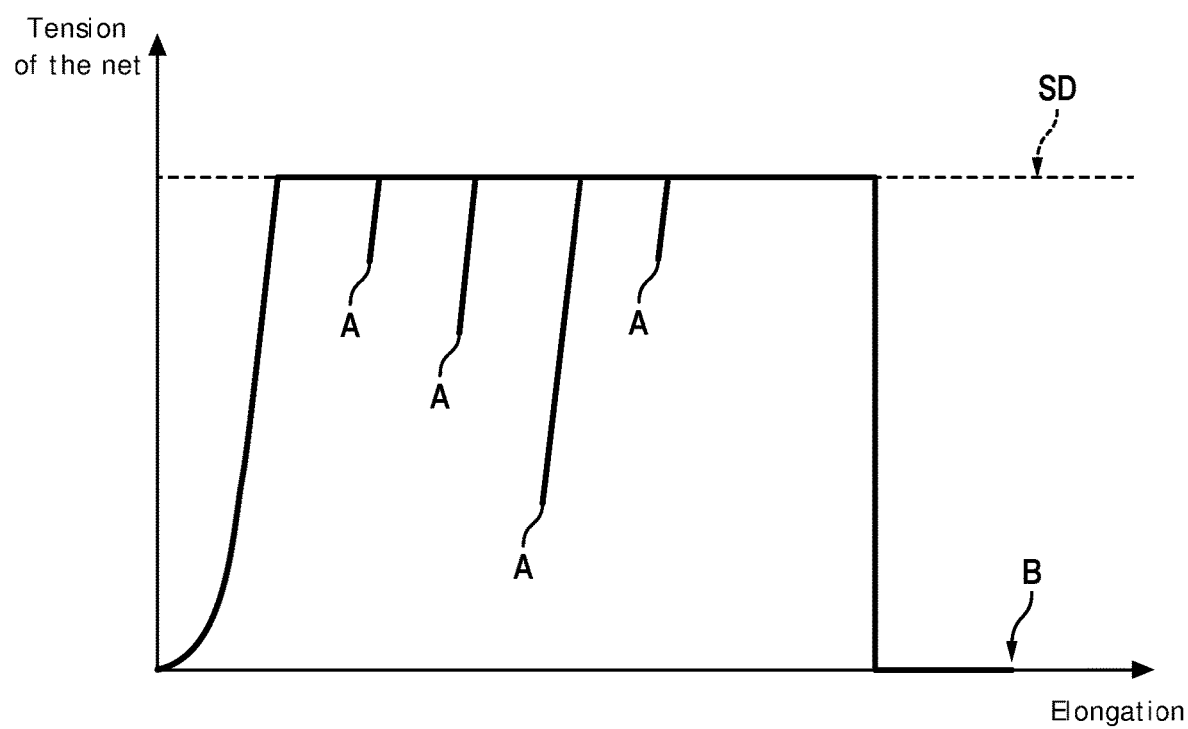
FIG. 9 is a graphic showing, as a function of the tension exerted on a net of a barrier, the elongation of a strap it is fitted with, and this according to the present invention.

The attached FIG. 9 illustrates the behaviour of a net of a barrier according to the invention, compared to a net of a barrier according to the prior art of FIG. 4, as is illustrated in FIG. 8.

These two figures show in abscissa the elongation of the elementary net 1 fitted with the strap 6 and in ordinates the progression of the tension to which this net is subjected. Also, the dashed line SD corresponds to the unloading threshold, that is, the tension beyond which the strands 62A and 62B separate according to the invention (respectively the straps 5A to 5C break according to the prior art).

In FIG. 9, it is evident that the net 1 remains permanently taut and that any decrease in tension stops separation of the strands 62A and 62B. The net can elongate continually without ever fully loosening. The temporary losses in tension illustrated by the reference A correspond to the loading by other elementary nets of part of the braking force of the barrier. The reference B corresponds to the maximum programmed elongation of the elementary net, after the binding wire of the strands 62A and 62B has completely detached.

In FIG. 8, it is evident that the three peaks C are enough to fully consume the extension reserve of the strap of the elementary net 1. The reference D corresponds to the maximum programmed elongation of the elementary net, after the straps 5A to 5C have fulfilled their "shunt" function.

Figure 10:
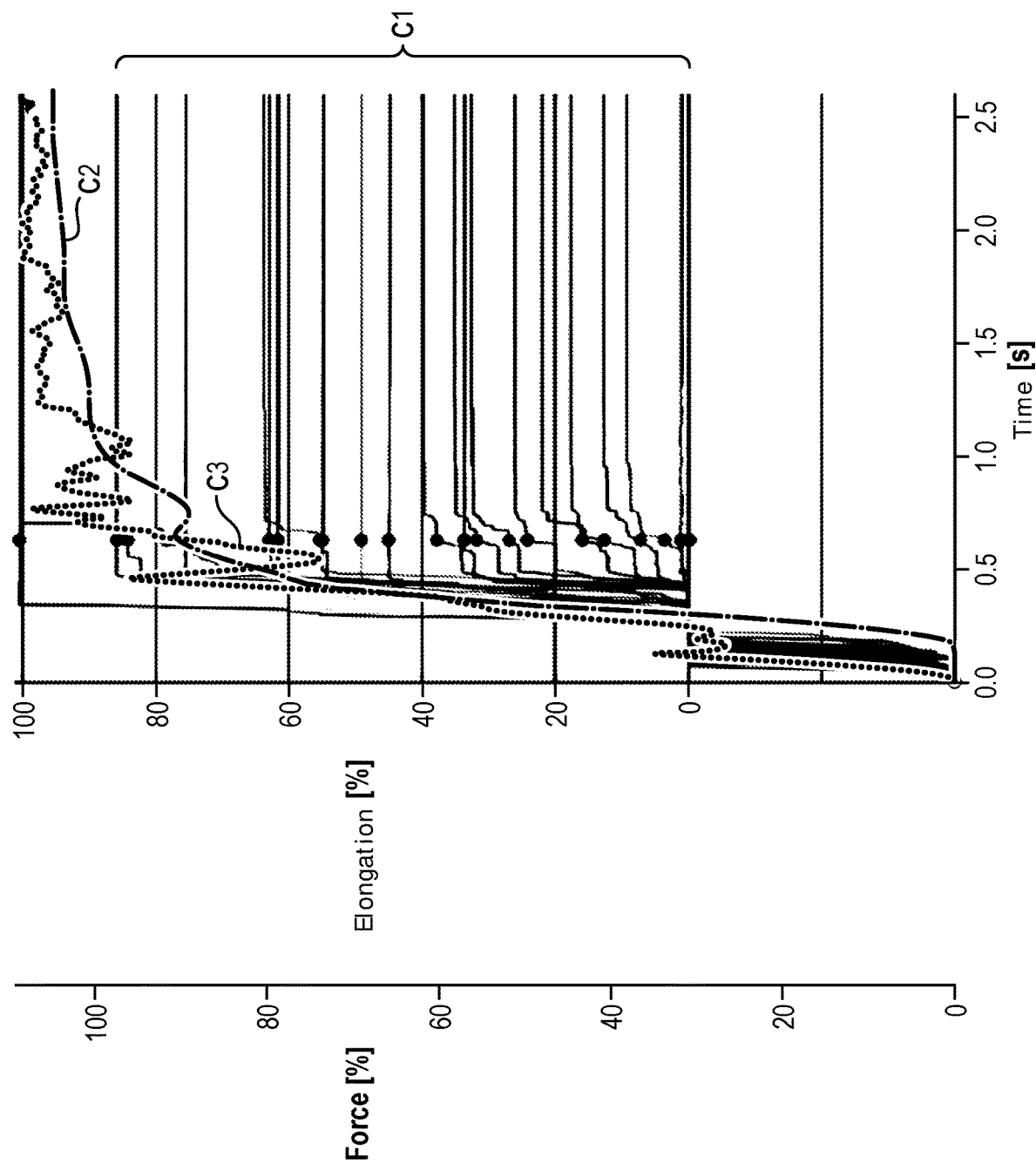
FIG. 10 is a graphic showing as a function of time on the one hand the displacement of individual nets together forming a crash barrier according to the invention and also the total of the supporting forces of the nets on an aircraft.

FIG. 10 is drawn from an engagement simulation test, that is, stopping of a plane (of which the known speed and mass yield the forces exerted on the elementary nets 1), which show twenty-four partial and successive separations of the strands 62A and 62B.

Each curve C1 corresponds to an elementary net 1. The elongations of the nets are expressed in ordinates, whereas the time elapsing during these elongations are expressed in abscissa.

The curve C2 corresponds to the sum of the reaction forces for ground-anchoring of the braking devices, the forces being in ordinates.

The curve C3 corresponds to the total support forces of the nets 1 on the plane, the forces being in ordinates also.

More precisely, on a curve C1, a mass movement of 100% can be observed, which corresponds to the tensing of the whole section 21 after the binding wire above is completely torn. This happens in under 0.5 second.

For each other curve C1, multiple successive "microplates" are noted, which corresponds to progressive tears of the binding wire up to 0.75 seconds, then no more tearing (fixed lengths).

It is clear that just before the final plate tears all are happening at the instant t=0.7 s. This means that the elementary nets at this stage almost all have different lengths.

At around 0.7 s, many micro-plates are noticed showing that the load has dropped to below the tear threshold, and therefore that the elementary nets have loosened since they are no longer lengthening over a period of a few hundredths or tenths of a second.

The invention claimed is:

1. A crash barrier for an aircraft, comprising:
    an array of elementary nets arranged parallel to each other, each of said elementary nets comprising a generally vertical stop structure which extends between a first upper strap and at least one second lower strap, said first upper and second lower straps each comprising two end portions attached to a braking device, said two end portions of the one and/or the other of said upper and lower straps comprising a loosened intermediate section with opposite ends, which is not tensed and which forms an "overlength";
    an additional strap with a binding wire, opposite ends of said additional strap being fastened by linking means to the opposite ends of said loosened intermediate section;
    wherein said additional strap comprises a region which is constituted by two distinct and contiguous strands, the binding wire of said additional strap being common to said two distinct and contiguous strands, the pull-out resistance of said binding wire being less than that of said linking means.

2. The crash barrier according to claim 1, wherein said linking means comprise sewing wires.

3. The crash barrier according to claim 2, wherein said sewing wires extend over a length of at least 50 millimetres.

4. The crash barrier according to claim 1, wherein a total length of said loosened intermediate section is more than the total length of said additional strap when said strands are separated from each other.

5. The crash barrier according to claim 1, wherein said linking means are formed by adhesion.

6. The crash barrier according to claim 1, wherein said linking means comprises an assembly made by high-frequency welding.

* * * * *